United States Patent [19]

Modic

[11] Patent Number: 5,066,726

[45] Date of Patent: Nov. 19, 1991

[54] PROCESS FOR MELT GRAFTING EPOXY COMPOUNDS TO POLYMERS

[75] Inventor: Michael J. Modic, Richmond, Tex.

[73] Assignee: Shell Oil Company, Houston, Tex.

[21] Appl. No.: 513,392

[22] Filed: Apr. 23, 1990

[51] Int. Cl.[5] .................. C08F 255/06; C08F 279/02; C08F 265/08; C08F 287/00

[52] U.S. Cl. .................................... 525/263; 525/286; 525/314; 525/319; 525/322; 525/324

[58] Field of Search ......................................... 525/263

[56] References Cited

U.S. PATENT DOCUMENTS 4,578,429  3/1986  Gergen et al. ...................... 525/291
4,657,971  4/1987  Shiraki et al. ......................... 525/57

FOREIGN PATENT DOCUMENTS 211467  6/1986  European Pat. Off. .
268981  11/1987 European Pat. Off. .
126164  6/1986  Japan .
PCT/US86/-
  00014  1/1986  World Int. Prop. O. .

*Primary Examiner*—John C. Bleutge
*Assistant Examiner*—Vasu S. Jagannathan

[57] ABSTRACT

A process to graft epoxy containing functional monomers to a base polymer is provided, the process comprising the steps of: providing a melt of a base polymer; containing the melt of the base polymer with a functional monomer in the presence of a free radical initiator at a temperature of less than 240° C., the functional monomer comprising alpha-beta ethylenic unsaturation and an epoxy group; and recovering an epoxy functionalized polymer. Grafting the epoxy containing monomer to the base polymer at temperatures of 240° C. and less results in a low level of hydrolyzed epoxy groups.

22 Claims, No Drawings

PROCESS FOR MELT GRAFTING EPOXY COMPOUNDS TO POLYMERS

FIELD OF THE INVENTION

This invention relates to a process to melt graft epoxy containing compounds to polymers.

BACKGROUND

Incorporation of polar functionality, including epoxy functionality, onto nonpolar base polymers has been the subject of many recent patents and publications. These functional group containing polymers have many utilities, such as impact modifiers for engineering thermoplastics, and elastomers with increased service temperatures. Epoxy modified polymers may be prepared by grafting epoxy containing monomers to base polymers by either solution processes or by melt processes.

Shiraki et al., in U.S. Pat. No. 4,657,971, disclose the use of functionalized block copolymers of styrene and butadiene as impact modifiers for polar engineering thermoplastics and a process to prepare these functionalized polymers by melt phase grafting functional monomers to base block copolymers. Acceptable functional groups include epoxy groups.

Oliver, in published application WO 86/04076, discloses an epoxy modified EPDM rubber which is useful as an impact modifiers for polyesters and a process to prepare the epoxy modified EPDM rubber. Oliver's rubber is functionalized by solution grafting an ester of an alpha-beta unsaturated acid which has an epoxy functionality on the alkoxy portion of the ester. Examples utilize glycidyl acrylate and glycidyl methacrylate as the ester.

Solution grafting of functional monomers to polymers is advantageous over melt grafting because the base polymer is less degraded by the grafting process. But solution grafting is often uneconomic because of the extended holding times required for the reaction to take place. Solution reaction generally requires reaction times of from one half to two hours. Dissolving the polymers and subsequent recovery of the solvent are also necessary and add to the expense of the process. Melt phase grafting is therefore the preferred grafting method when the resultant degradation of the polymer can be tolerated.

Melt phase grafting of epoxy containing monomers can also result in the epoxy rings being opened by hydrolysis of the epoxy to two hydroxyl groups. Melt phase grafting of glycidyl acrylate at conditions typical of extrusion grafting maleic anhydride (about 260° C.) results in about 80 percent of the epoxy rings on the grafted monomers being hydrolyzed. The resultant hydroxyl functional groups are not as effective as epoxy groups because they are generally not as "reactive" or as polar as the initial epoxy groups. To result in a desired level of epoxy functionality, melt phase grafting requires the grafting of additional functional monomers due to the grafted functional monomers which have been converted to hydroxyl functionality. Grafting the additional functional monomers is generally undesirable because it causes exponentially increasing degradation of the base polymer.

It would be desirable to have a melt phase grafting process to graft epoxy functional groups to base polymers in which a large amount of the epoxy rings are not opened by the grafting process. It is therefore an object of the present invention to provide a process to melt phase graft epoxy containing monomers to the base polymers wherein the grafted monomers retain a high level of epoxy functionality. In the preferred embodiment, it is a further object to provide a process to melt graft epoxy functionality to the base polymers in which the base polymers are not excessively degraded by the melt grafting process.

SUMMARY OF THE INVENTION

The object of the present invention is achieved by providing a process to graft epoxy containing functional monomers to a base polymer comprising the steps of: providing a melt of a base polymer; contacting the melt of the base polymer with a functional monomer in the presence of a free radical initiator at a temperature not exceeding 240° C., the functional monomer comprising alpha-beta ethylenic unsaturation and an epoxy group; and recovering an epoxy functionalized polymer.

It has surprisingly been found that the desired level of epoxy functionality is retained only if the grafting occurs at temperatures below about 240° C. Retaining a high percentage of epoxy functionality minimizes the amount of monomer which must be grafted to the base polymer to achieve a desired level of epoxy functionality. This minimizes the degradation of the base polymer caused by functionalization, and minimizes the amount of epoxy containing monomers being required.

In a preferred embodiment, the base polymer is a hydrogenated block copolymer of a vinyl aromatics and conjugated diolefins, and the free radical initiator is one having a one hour half life temperature between about 100° C. and about 125° C. In the most preferred embodiment, the melt phase reaction is accomplished in an extruder.

DETAILED DESCRIPTION OF THE INVENTION

The base polymer of the present invention may be any polymer which is graftable with alpha-beta ethylenically unsaturated monomers and is in a melt phase at a temperature of less than 240° C. The base polymer preferably has a backbone which comprises carbon to carbon bonds. Examples are styrene-butadiene block copolymers, styrene-isoprene block copolymers, polybutadiene, polyisoprene, polyethylene, polypropylenes, ethylene-propylene copolymers, ethylene-propylene-diene terpolymers and terpolymers of ethylene-propylene and a diolefin, SBR, polybutylene, and butadiene-acrylonitrile copolymers. Polymers which contain ethylenic unsaturation may be either hydrogenated or unhydrogenated. These polymers are each commercially available and well known in the art. Homopolymers of styrene are generally difficult to graft with alpha-beta ethylenically unsaturated monomers, and are therefore not preferred. Polymers that include functional groups which are reactive with the epoxy groups of the functional monomer are also not preferred as the base polymer of this invention because the reaction of the epoxy groups with the polymer's functional groups will crosslink the polymer and reduce the epoxy group content of the functionalized polymer. Polyesters, polyamides, polyvinyl alcohols, and polyvinyl chlorides and other halogenated polymers are therefore not preferred.

A preferred polymer is a hydrogenated conjugated diolefin-vinyl aromatic block copolymer. These polymers are preferred because they have excellent elastomeric properties and are reprocessable.

The preferred block copolymer may be produced by any block polymerization procedure including sequential addition of monomer techniques, incremental addition of monomer techniques, or various coupling techniques. Tapered copolymer techniques may also be used. Useful linear block copolymers include linear block copolymers such as those described in U.S. Pat. Nos. 3,231,635; 3,265,765 and 3,322,856, which are incorporated herein by reference. Radial block copolymers such as those described in U.S. Pat. Nos. 4,033,888; 4,077,893; 4,141,847; 4,391,949 and 4,444,953, which are incorporated herein by reference may also be used. The radial polymer may be symmetric or asymmetric.

The blocks of the preferred block copolymer may be either homopolymer, random or tapered copolymer blocks as long as each block has at least about 80 percent of the class of the monomers characterizing the block. The block copolymers of conjugated diolefins and vinyl aromatics are preferably polyisoprene block containing copolymers or polybutadiene block containing copolymers which have a polybutadiene 1,2-microstructure content of from about 7% to about 100% and more preferably 35% to 55%. These copolymers are preferred because of there excellent elastomeric properties.

Temperatures at which vinyl aromatic block containing copolymers may be melt processed generally are dictated by the glass transition temperatures of the vinyl aromatic domains. These block copolymers are generally melt processable at temperatures greater than about 200° C. and preferrably 210° C.

The preferred conjugated diolefin-vinyl aromatic block copolymers of this invention may contain various ratios of conjugated diolefins to vinyl aromatics. These block copolymers will preferably be between about 1 and about 60 weight percent by weight vinyl aromatic blocks and more preferably between about 5 and about 40 percent by weight vinyl aromatic blocks. Larger amounts of vinyl aromatic blocks result in a polymer which is not elastomeric, and lesser amounts result in insufficient vinyl aromatics to form separate domains.

The number average molecular weights of the individual blocks may vary within certain limits. In most instances, the vinyl aromatic blocks will have from about one vinyl aromatic monomer unit per block to a number average molecular weight of about 60,000. Preferably, the vinyl aromatic blocks have number average molecular weights of from about 1000 to about 50,000. Vinyl aromatic blocks having number average molecular weights of less than about 1000 do not generally form separate vinyl aromatic domains, and therefore do not have acceptable tensile strengths. Conjugated diolefin blocks will have number average molecular weights of about 5,000 to about 450,000, and preferably about 10,000 to about 150,000. These molecular weights are most accurately determined by gel permeation chromatography and/or low angle light scattering techniques.

The base block copolymer may optionally be hydrogenated, and are preferably hydrogenated. Hydrogenation improves thermal, oxidative and U.V. stability of conjugated diolefin containing polymers. When the base block copolymer is hydrogenated, selective hydrogenation is especially preferred. Selective hydrogenation refers to hydrogenation of the ethylenic unsaturation while the aromatic saturation is not hydrogenated.

Hydrogenation of the polymer may be accomplished using any of the methods known in the prior art. The hydrogenation will preferably be selective hydrogenation accomplished using a method such as those taught in U.S. Pat. Nos. 3,494,942; 3,634,549; 3,670,054; 3,700,633 and Re 27,145, which are incorporated herein by reference. Most preferably, selective hydrogenation will be accomplished using one of the processes taught in U.S. Pat. No. 3,700,633. These hydrogenation processes involve the use of a suitable catalyst, particularly a catalyst or catalyst precursor comprising an iron group metal compound. In the method described in these patents, the catalyst is prepared by combining an iron group metal, particularly a nickel or cobalt compound with a suitable reducing agent such as an aluminum alkyl. The preferred iron group metal compounds are carboxylates and alkoxides.

The block copolymers are preferably selectively hydrogenated so as to hydrogenate at least about 80 percent and most preferably greater than 98 percent of the initial ethylenic unsaturation. Preferably, less than 10 percent and most preferably less than 2 percent of the initial aromatic unsaturation is hydrogenated.

Gergen et al., U.S. Pat. No. 4,578,429, discloses that a polymer does not require ethylenic unsaturation to be graftable with ethylenically unsaturated monomers. It is therefore not necessary that the base polymer of the present invention contain ethylenic unsaturation. Polyethylene, polypropylene, polyisobutene and copolymers thereof could therefore be functionalized with epoxy groups by the practice of the present invention along with highly hydrogenated polymers of conjugated diolefins.

Grafting of the functional monomer to the base polymer is performed at a temperature about the melting temperature of the base polymer, but at a temperature which does not exceed 240° C. and preferably at a temperature which does not exceeding 225° C. It has been found that this limitation is critical in producing an epoxy functionalized polymer with a low level of hydrolyzed epoxy groups. The temperature of the grafting operation must be above the melt temperature of the base polymer in order for the grafting to take place in a melt. When vinyl aromatic-conjugated diolefin block copolymers are utilized in this invention, the preferred minimum grafting temperature is 200° C. and the more preferred minimum grafting temperature is 210° C.

The functional monomer to be grafted to the base polymer must comprise alpha-beta ethylenic unsaturation, and at least one epoxy group. Other functional groups may be present. For example, glycidyl acrylate and glycidyl methacrylate are esters which contain alpha-beta ethylenic unsaturation and epoxy functionality and can be grafted to polymers by the process of the present invention.

The amount of functional monomer contacted with the base polymer is preferably within the range of about 0.1 to about 10 parts by weight for 100 parts by weight of base polymer. More preferably, about 0.3 to about 5.0 parts by weight of functional monomer are used. Larger amounts of functional monomer can lead to reduced grafting efficiency and therefore excess unreacted epoxy containing monomer in the product. Lesser amounts of functional monomer result in an insufficient number of functional groups grafted to the base polymer to significantly effect the properties of the base polymer.

A free radical initiator must be present when the base polymer is blended with the functional monomer to achieve an acceptable level of grafting without opening more than 20% of the grafted epoxy rings. Thermal grafting, which does not require a free radical initiator, is known but temperatures and reaction times are excessive. This results in excessive degradation of the base polymer. Thermal grafting is therefore generally not acceptable.

Free radical initiators which are acceptable include but are not limited to dialkyl peroxides. Careful selection of the free radical initiator is required to result in the maximum amount of grafted functional monomer for a given level of free radical initiator and functional monomer. A most preferred free radical initiator is 1,1-bis(t-butylperoxy)-3,3,5-trimethyl cyclohexane, which is commercially available under the trade name of Lupersol 231 from Pennwalt Corporation of Buffalo, N.Y. This free radical initiator is most preferred because it results in a high ratio of grafted to nongrafted functional monomer in the required temperature range of this invention and in a typical single screw or twin screw extruder.

Free radical initiators which are peroxides create free radicals by decomposing from a structure of $R_1OOR_2$ to free radicals $R_1O\cdot$ and $R_2O\cdot$. An appropriate peroxide will generate free radicals at the desired temperature of the free radical initiated grafting, and will continue to generate them as the grafting continues. Other free radical initiators with thermal stabilities similar to 1,1-bis(t-butylperoxy)-3,3,5-trimethylcyclohexane would therefore also be expected to be effective in the present invention. Thermal stability of free radical initiators can be indicated by the temperature which is required to decompose one-half of the molecules in one hour. This is called the one hour half life temperature. The one hour half life temperature of 1,1-bis(t-butylperoxy)-3,3,5-trimethylcyclohexane is 112° C. Free radical initiators which have one hour half life temperatures of from about 100° C. to about 125° C. have stabilities similar to 1,1-bis(t-butylperoxy)-3,3,5-trimethylcyclohexane and are therefore preferred.

Peroxides which are known to have one hour half life temperatures within the range of from 100° C. to 125° C. include t-butyl peroxymaleic acid, 1-hydroxy-1-hydroperoxydicyclohexyl peroxide, t-butyl peroxycrotonate, 2,2-bis(t-butylperoxy butane), t-butylperoxy isopropyl carbonate 2,5-dimethyl-2,5-bis(benzoylperoxy)hexane, t-butyl peracetate, di-t-butyl diperoxy phthalate, t-butyl perbenzoate, t-butyl peracetate, and t-butyl peroxyisobutyrate.

The amount of free radical initiator which is present is preferably between about 0.2 and about 2.0 parts by weight based on 100 parts by weight of base polymer. Most preferably between about 0.05 and about 1.0 parts by weight of radical initiator is present based on 100 parts by weight of base polymer. Larger amounts of free radical initiators generally result in excessive degradation of the base polymer during the grafting process. Lesser amounts of free radical initiators generally result in low grafting efficiencies.

The functional monomer and base polymer are contacted in a melt of the base polymer. It is preferred that the base polymer and the functional monomer be contacted in a melt in an apparatus capable of imparting a high level of mixing to rapidly contact the reactants. Devices such as an extruder, a Banbury mixer, a sigma blade mixer and the like are examples of devices capable of imparting high levels of mixing. Extruders are most preferred to ensure rapid mixing and adequate temperature control. A twin screw extruder or a single screw extruder may be utilized.

The free radical initiator could therefore be mixed with the base polymer before the base polymer is combined with the functional monomer, mixed with the functional monomer before the functional monomer before it is combined with the base polymer, or mixed with a melt of the base polymer and functional monomer. The temperature of the free radical initiator, functional monomer and base polymer is preferably brought to the desired temperature range rapidly because it has been found that grafting at temperatures below the temperature at which the base polymer is effectively melt processable results in an undesirably large amount of the epoxy rings being opened. This is probably due to localized higher temperatures due to the high shear which results from processing the polymer at these bulk temperatures. It is therefore most preferred that the free radical initiator be injected into a melt of the base polymer and functional monomer with the melt being at or near the desired grafting temperature.

The contacting of the functional monomers and the base polymers in preferably for a time period sufficient to graft from about 30 percent to about 90 percent of the functional monomers present to the base polymer. In an extruder, a residence time of about one to about six seconds is generally sufficient, but is greatly dependent upon the amount and type of free radical initiator present.

The process of this invention can result in 60 to 100 percent of the grafted monomers retaining unopened epoxy rings. Further, in the preferred embodiment of the present invention, the degradation of the base polymer is below 50 percent by weight of the initial base polymer as measured by the decrease in the main gel permeation chromatography peak.

EXAMPLES

Samples 1 through 16 were prepared by melt phase grafting glycidyl acrylate to a selectively hydrogenated styrene-butadiene block copolymer at varying temperatures in the presence of one of three different free radical initiators. The percent of grafted monomers which retained epoxy rings is unexpectedly higher at grafting temperatures of 240° C. and less.

The base polymer for each of the following is a selectively hydrogenated triblock copolymer having polystyrene end blocks of about 7500 number average molecular weight and a polybutadiene midblock of about 37,000 number average molecular weight and, before hydrogenation, about 35% vinyl content. The base polymer was selectively hydrogenated, saturating more than 98 percent of ethylenic unsaturation while more than 98 percent of the aromatic unsaturation remained.

Three different free radical initiators were used. They were: Lupersol 101 which is 2,5-dimethyl-2,5-d(t-butyl peroxy) hexane (L101); Lucidol 98 which is benzoyl peroxide (L98); and Lupersol 231 which is 1,1-bis(t-butyl peroxy)-3,3,5-trimethylcyclohexane (L231). These are commercially available from Pennwalt Corp. One hour half life temperatures for these free radical initiators are 138° C., 91° C., respectively.

The amount of functional monomer which was grafted to the polymer was determined by saponification of the ester segment with KOH in a toluene solution, forming a potassium salt. To ensure a complete reaction, the solution was stirred for two hours while being held at 109° C. The potassium salt was then acidified by contacting the saponified polymer with an excess of acetic acid in the toluene solution. The polymer was then precipitated in methanol, washed with deionized water to remove excess acetic acid, and vacuum dried for 16 hours at 100° C. The dried polymer was then weighed, dissolved in toluene and titrated with a base to determine the amount of functionality grafted to the polymer.

The amount of grafted functionality which remained in the epoxy form was determined by dissolving about 10 grams of the functionalized polymer in 95 mls of toluene, 5 mls of acetic acid, 4 mls of tetraethyl ammonium bromide (TEABR) reagent and 6 drops of crystal violet indicator. The solution was then titrated to a blue-green end point with 0.1N perchloric acid in acetic acid.

The effect of reaction temperature on the fraction of grafted epoxy functional groups which retain epoxy functionality was demonstrated by melt phase grafting glycidyl acrylate to the base polymer in a twin screw extruder at varying melt temperatures. The amount of glycidyl acrylate fed to the extruder was about 3.0 percent by weight based on the base polymer. Free radical initiator was fed to the extruder mixed with the glycidyl acrylate. The amount of free radical initiator was varied from 0.1 to 1.0 percent by weight based on the base polymer.

The percent of grafted functionality which remained as epoxy functionality for each of 16 samples is listed in Table 1, along with the extrusion temperature, type and amount of free radical initiator.

TABLE 1

| Sample | Initiator Type | % wt | Melt Temp. °C. | Percent of Functionality Which Remains as Epoxy |
|---|---|---|---|---|
| 1 | L231 | 0.2 | 198 | 60 |
| 2 | L98 | 0.2 | 199 | 74 |
| 3 | L101 | 0.5 | 201 | 83 |
| 4 | L101 | 0.2 | 201 | 78 |
| 5 | L101 | 0.2 | 203 | 80 |
| 6 | L231 | 0.5 | 204 | 90 |
| 7 | L101 | 0.2 | 207 | 97 |
| 8 | L101 | 0.2 | 212 | 100 |
| 9 | L101 | 0.2 | 213 | 100 |
| 10 | L231 | 0.5 | 216 | 93 |
| 11 | L231 | 1.0 | 218 | 91 |
| 12 | L101 | 0.5 | 228 | 88 |
| 13 | L101 | 0.1 | 231 | 73 |
| 14 | L231 | 0.5 | 234 | 84 |
| 15 | L101 | 0.2 | 241 | 78 |
| 16 | L101 | 0.1 | 258 | 17 |

It can be seen from Table 1 that the free radical initiator used does not effect the extent of ring opening, but that the melt temperature is critical in controlling ring opening. To graft the epoxy functionality with 60% or greater retained epoxy rings requires a melt temperature which is about 240° C. or less.

Samples 17 through 28 were prepared to compare polymer degradation and grafting efficiency as a function of free radical initiator type and the level of free radical initiator added. The grafting efficiency is the percent of glycidyl acrylate grafted to the polymer based on the glycidyl acrylate fed to the extruder. Three parts by weight, based on 100 parts by weight of the base polymer, of glycidyl acrylate were fed to the extruder for each sample. The results are summarized below in Table 2. The loss in main peak is the percentage decrease in the main molecular weight peak as determined by gel permeation chromatography. The loss in main peak represents the amount of polymer which is degraded to lower molecular weight polymers or coupled to higher molecular weight polymers during the extrusion grafting process.

TABLE 2

| Sample | Initiator Type | % wt | Grafting Eff. % | % Loss of Main |
|---|---|---|---|---|
| 17 | L231 | 0.2 | 50 | 13.0 |
| 18 | L231 | 0.5 | 53 | 21.7 |
| 19 | L231 | 0.5 | 63 | 30.0 |
| 20 | L231 | 1.0 | 65 | 33.5 |
| 21 | L101 | 0.1 | 33 | 13.8 |
| 22 | L101 | 0.2 | 37 | 19.1 |
| 23 | L101 | 0.2 | 40 | 19.6 |
| 24 | L101 | 0.2 | 40 | 21.1 |
| 25 | L101 | 0.2 | 47 | 19.2 |
| 26 | L101 | 0.5 | 53 | 50.1 |
| 27 | L101 | 1.0 | 53 | 60.0 |
| 28 | L101 | 0.5 | 57 | 47.6 |

From Table 2 it can be seen that the type of free radical initiator used has a surprising effect on the grafting efficiency, and the amount of degradation of the grafted polymer. At similar amounts of peroxide, L231 resulted in higher grafting efficiencies and lower levels of degradation.

I claim:

1. A melt phase process to graft epoxy containing functional monomers to a base polymer, wherein the base polymer is any polymer which is graftable with alpha-beta ethylenically unsaturated monomers and is in a melt phase at a temperature of less than 240° C., to produce an epoxy functionalized polymer comprising the steps of:

a) providing a melt of the base polymer, the base polymer being essentially free of functional groups that are reactive with epoxy functionality;

b) contacting the melt of the base polymer with a functional monomer in the presence of 1,1-bis(t-butylperoxy)-3,3,5-trimethylcyclohexane at a temperature not exceeding 240° C., the functional monomer comprising alpha-beta ethylenic unsaturation and epoxy functionality; and c) recovering an epoxy functionalized polymer.

2. The process of claim 1 wherein the contacting of the base polymer with the functional monomer occurs within an extruder.

3. The process of claim 1 wherein the base polymer is selected from the group consisting of polyethylene, polypropylene, ethylene-propylene hydrogenated polybutadiene, polyisoprene, hydrogenated polyisoprene, styrene-butadiene rubbers, styrene-butadiene block copolymers, styrene-isoprene block copolymers, polybutylene, polyisobutane, and butadiene-acrylonitrile copolymers.

4. The process of claim 1 wherein the functional monomer is glycidyl acrylate.

5. The process of claim 1 wherein the functional monomer is glycidyl methacrylate.

6. The process of claim 1 wherein the amount of functional monomer is between about 0.1 and about 10 percent by weight based on the base polymer.

7. The process of claim 1 wherein the amount of functional monomer is between about 0.3 and about 5 percent by weight based on the base polymer.

8. Process of claim 1 wherein the melt of the base polymer and the functional monomer are contacted at a temperature within the range of about 200° C. to about 240° C.

9. Process of claim 1 wherein the melt of the base polymer and the functional monomer are contacted at a temperature within the range of about 210° C. to about 225° C.

10. The process of claim 1 wherein the base polymer is a hydrogenated block copolymer comprising at least one block which comprises predominately polymerized vinyl aromatics and at least one block which comprises, before hydrogenation, predominately polymerized conjugated diolefins.

11. The process of claim 10 wherein the vinyl aromatics are styrene.

12. The process of claim 10 wherein the conjugated diolefins are selected from the group consisting of butadiene, isoprene and mixtures thereof.

13. The process of claim 10 wherein hydrogenation has eliminated 90% or more of the initial ethylenic unsaturation of the block copolymer.

14. The process of claim 10 wherein hydrogenation has eliminated 98% or more of the initial ethylenic unsaturation of the block copolymer.

15. The process of claim 10 wherein the hydrogenated block copolymer is a hydrogenated linear triblock copolymer having the structure of polystyrene-polybutadiene-polystyrene.

16. The process of claim 10 wherein the hydrogenated block copolymer is a hydrogenated linear triblock copolymer having the structure of polystyrene-polyisoprene-polystyrene.

17. The process of claim 1 wherein the free radical initiator has a one hour half life temperature of between about 100° C. and about 125° C.

18. The process of claim 1 wherein the free radical initiator has a one hour half life temperature of about 112° C.

19. The process of claim 17 wherein between about 0.05 parts by weight and about 1.0 parts weight of free radical initiator is present, for each 100 parts by weight of base polymer.

20. The process of claim 15 wherein the free radical initiator is present in an amount of about 0.05 and about 1.0 parts by weight for each 100 parts by weight of the base polymer.

21. The process of claim 20 wherein the functional monomer is glycidyl acrylate.

22. The process of claim 21 wherein the from 0.3 to about 5 parts by weight of glycidyl acrylate is contacted with 100 parts by weight of the base polymer.

* * * * *